May 20, 1941.    E. G. LEONARDON    2,242,612
METHOD FOR DETERMINING THE BEDS TRAVERSED BY DRILL HOLES
Filed May 25, 1937    2 Sheets-Sheet 1
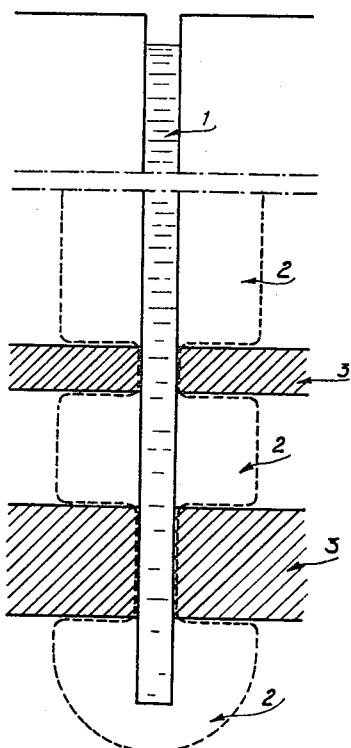
Fig: 1
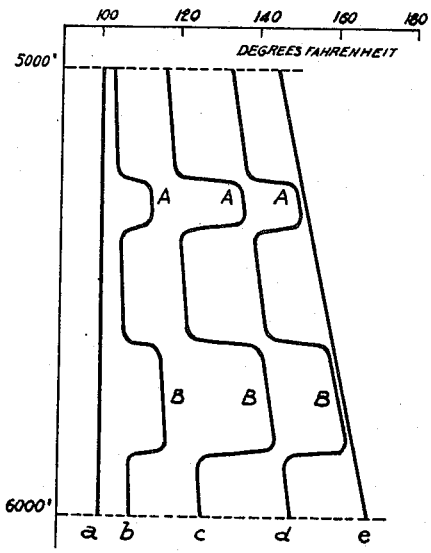
Fig: 2
INVENTOR
Eugene G. Leonardon
BY
Mauro + Lewis,
ATTORNEYS

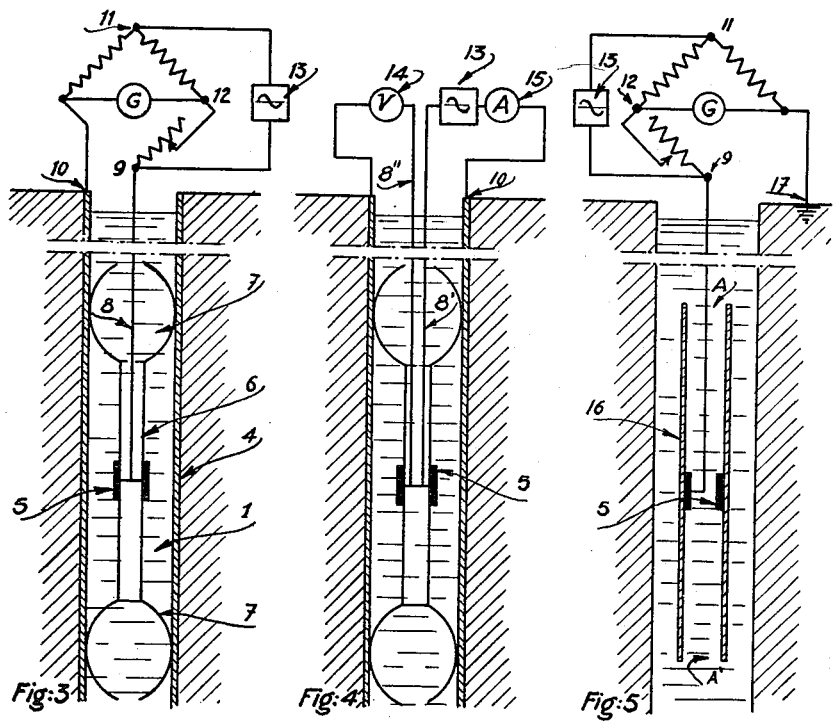
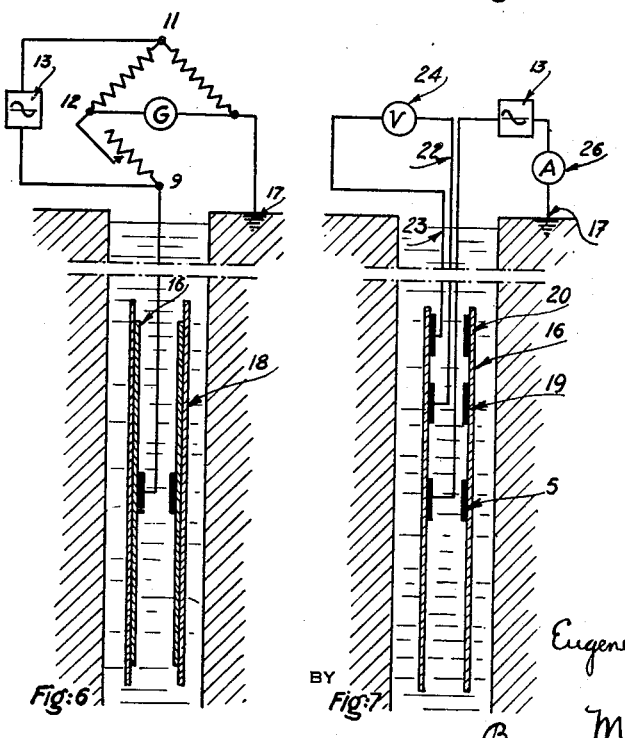

Patented May 20, 1941

2,242,612

UNITED STATES PATENT OFFICE 2,242,612

METHOD FOR DETERMINING THE BEDS TRAVERSED BY DRILL HOLES

Eugene G. Leonardon, Houston, Tex., assignor to Schlumberger Well Surveying Corporation, Houston, Tex., a corporation of Delaware Application May 25, 1937, Serial No. 144,735

15 Claims. (Cl. 73—51)

The present invention concerns the determination and the location of the beds traversed by a drill hole, and more particularly the determination and location of these beds by thermometric means.

Its object is to determine and locate the level of the different beds, by differentiating these beds by means of their thermal properties. Its object is more particularly the determination of the level of porous beds containing a fluid (water, oil or gas) inside a drill hole, and particularly inside holes already cased and even cemented. Its further object is to establish correlations between the beds traversed by different drill holes situated in the same zone, by comparisons between the thermal properties of the beds traversed by these different drill holes.

The invention is based on that property of geological formations which may be aptly termed their "apparent thermal conductibility"; which property is their ability to transmit heat to a certain extent more or less rapidly, and to warm up or cool down more or less rapidly. This "apparent thermal conductibility" depends upon different factors. In the case of impervious formations, it is particularly the specific conductivity and the calorific capacity of the rocks which affect and determine the apparent thermal conductivity. In the case, however, of porous beds, it is due primarily to the influence of convection currents produced in the fluid filling the beds, when the latter are brought into contact with a medium of different temperature. As a result of these convection currents the permeable beds transmit heat very rapidly, and have thus a very high apparent thermal conductibility in relation to the non-permeable beds.

Whatever the determining factors, the apparent calorific conductibility of the beds is a characteristic one, and one which makes possible to distinguish them one from another, and eventually to determine their nature.

It has been proposed heretofore to determine the beds cut by a drill hole by making use of their apparent calorific conductibility, in the following manner: the drill hole is filled with a liquid whose temperature is very different from that obtained in the beds traversed by the drill hole, and which, in the account which follows, we will consider as being always colder. The evolution of the temperature of this liquid inside the drill hole in function of time is then studied. Liquids located at the level of beds having a high calorific conductibility are warmed more quickly than liquids at the level of beds having a low calorific conductibility; and this difference manifests itself on the temperature diagrams made shortly after the drill hole has been filled, as relatively warmer zones which indicate the level of the beds with a high calorific conductibility.

The process just described does not give very exact results in practice. Because of the small section of a drill hole and the consequently small calorific capacity of the liquid which it contains, that liquid is very rapidly warmed; and this occurs not only in the liquid opposite beds of high apparent calorific conductibility, but also in that opposite beds of low apparent calorific conductibility; so that the phenomenon which has to be measured is transient and but slightly apparent.

The present invention, on the contrary, makes it possible to render discernible in a much more evident and lasting manner the differences of apparent calorific conductibility of different beds. To this end, a liquid whose temperature differs greatly from the natural temperature of the beds traversed by a drill hole, is made to circulate in the latter. It will be assumed hereinafter that the liquid is colder than the beds, which is most often the case in practice. The circulation is continued for a time sufficiently long to create in the impervious beds a cold sheath surrounding the drill hole, and whose thickness is of the order of a foot or even more. During this circulation of the liquid, the porous beds also absorb frigories; but their temperature is not noticeably modified, since the cold sheath which has a tendency to form around the drill hole is systematically eliminated by the action of the convection currents, due to which the frigories absorbed are evacuated a long distance away in the bed. After stoppage of the circulation, the cold sheath lasts a very long time, in some cases as long as several weeks. Due to the low calorific conductibility of the beds, this sheath is absorbed very slowly by the arrival of calories coming from the depth of the beds; and hence it follows that the liquid contained in the drill hole at the level of the impervious beds will itself be warmed only very slowly, as the cold sheath is reabsorbed. This warming of the liquid takes place unevenly, according to the apparent thermal conductibility of the different impervious beds.

The liquid at the level of the porous beds, on the contrary, is very quickly warmed, since those beds have practically retained their initial temperature. Therefore, if temperature measurements are made a certain time after the circulation of the liquid has stopped, temperature diagrams will be obtained on which the porous beds are marked by relatively warmer zones, whereby they can be identified. The several impervious beds are likewise differentiated by means of the irregularities (which, however, are relatively slight) on the temperature diagrams.

Experience has proved that this process, which can of course be used in uncased holes, also gives good results in cased and cemented drill holes, notwithstanding the presence of the cement and casing.

The duration of the circulation of the liquid inside the drill hole for the purpose of changing the temperature of the beds surrounding the drill hole varies within rather large limits (a few hours to twenty or thirty hours, or even longer).

At least one series of measurements will be made, as described above, a certain time after the circulation of the liquid has been stopped in the drill hole. But, instead of making only one series of measurements, it is possible, and this constitutes one of the characteristics of the invention, to make several temperature measurements. One such series of measurements may be made immediately after the liquid has ceased to circulate inside the drill hole, so as to ascertain that at this moment the liquid has a regular and practically uniform temperature. The other series of measurements (one or several) are made a greater or less long time afterwards. Comparison of the diagrams thus obtained makes possible to locate even more exactly the porous beds containing a fluid, liquid or gas, as will be more particularly described further on, with reference to the attached drawings.

As regards the actual temperature measurements, they may be made with any appropriate apparatus, preferably with an apparatus permitting the continuous recording of the temperatures as a thermometric body is moved inside the drill hole, along its length. In accordance with the invention this temperature determination may also be made in a very simple manner by measuring or recording a parameter-function of the resistivity of the liquid filling the drill hole, at different levels inside this drill hole. For, in fact, this liquid filling the drill hole having circulated, and accordingly having been well mixed during several hours, is of absolutely homogeneous composition; its electrical resistivity being therefore only a function of its temperature and varying roughly by one sixtieth per degree Fahrenheit. Thus any measurement of a parameter-function of the resistivity of this liquid makes it possible to determine its temperature.

In practice an electrical current may be sent into the liquid filling the drill hole at the different levels where temperature measurements are to be carried out and the effects of this current measured. Several apparatuses which may be used for this purpose are described hereinafter.

Further characteristics of the invention will appear in the following description in connection with the accompanying drawings, which represent diagrammatically and by way of non-limiting examples, some methods and devices by which the present invention may be practiced.

In said drawings—

Fig. 1 represents diagrammatically the section of formations cut by a drill hole, on which the zones of these formations whose temperature has been changed by the circulating of the liquid, have been marked.

Fig. 2 exhibits different temperature diagrams taken in this drill hole at different time intervals after the circulation had been stopped.

Figs. 3, 4, 5, 6 and 7 are drawings of devices which may be used for making thermometric measurements inside the drill hole.

In Fig. 1, 1 is a drill hole with a depth of, for example, 6,000 ft., traversing a succession of impermeable beds 2 and porous beds 3 (water sands, for example). For the sake of clarity, we shall assume that the different impermeable beds have the same apparent calorific conductibility. Cold muds are circulated in the drill hole (at a temperature of 100° F., for example, during twenty-four hours). This duration is sufficient to cool considerably the beds traversed by the drill hole in zones extending to a distance of a few feet around the drill hole, as indicated by broken lines.

The first temperature measurements are made immediately after the circulation of the muds has stopped. A curve such as $a$, Fig. 2, is then obtained this curve being practically rectilinear. Thereafter successive temperature measurements will be made; for example, five hours after the cessation of the mud circulation, then twenty hours after the cessation, then one hundred hours after, and finally several weeks after.

Different temperature diagrams will thus be obtained, such as diagrams $b$, $c$, $d$, $e$. On examining diagrams $b$, $c$ and $d$ in particular, it will be seen that in certain places they show warmer zones, A, B, etc., whereby, as stated above, it is possible to locate the porous beds containing a fluid (liquids or gas).

As time passes, all the beds finally regain their initial temperature and warm the liquid filling the drill hole, so that at the end of several weeks, for example, diagram $e$ is obtained, which gives the distribution of the natural temperatures in the beds, increasing regularly with the depth as if no cooling had taken place.

In practice, it is of course not necessary to make such a large number of temperature diagrams in order to locate the porous beds. Their number can be reduced to one, taken a few hours after the mud circulation, or to two, the comparison of which indicates in a more certain manner the places which are more rapidly warmed than others.

In the above example the temperature of the liquid circulated in the drill hole is lower than the natural temperature of the beds. This is most frequently the case, as it is the easiest to bring about in practice, it being well known that the temperature of the beds increases as one penetrates deeper into the ground (geothermic gradient). Furthermore, the drilling muds, which usually constitute the liquids circulated in the drill hole, are caused, by the circulating method itself, to pass through the mud pits etc. at the surface of the ground, and to cool therein by evaporation, etc., before being flowed again into the drill hole. Thus the simple circulation of these muds by the ordinary process gives the desired result. It must also be noted that it is generally only the deep, and consequently the hottest beds, which it is of interest to locate, especially in oil wells.

In certain cases, however, and in particular in the very rare instances in which it is desired to locate beds at shallow depth, and therefore relatively cold, it is possible, in accordance with the invention, to use a liquid whose temperature is higher than that of the beds traversed by the drill hole. In the example given above, it is assumed, as stated, that the different impermeable beds had the same apparent calorific conductibility. In reality this frequently is not the case; and because of this certain irregularities will appear on the temperature diagram, whereby it is possible eventually to differentiate the several impermeable formations, and in any case to establish correlations between the same beds traversed by different drill holes situated in the same zone. A comparison of different thermal diagrams made in accordance with the invention in these different drill holes makes it possible to distinguish at what level the same formation is traversed by the different drill holes.

Figs. 3, 4, 5, 6 and 7 represent, as has been stated, different devices for making thermometric measurements by means of measurements of the resistivity of the liquid contained in the drill hole. These are given merely as examples, and it is possible, in accordance with the invention, to use any known apparatus for measuring the resistivity of the muds inside a drill hole.

Figs. 3 and 4 show respectively two constructional forms which may be used either in cased or uncased drill holes.

In Fig. 3, the apparatus to be lowered in the drill hole 1, which is fitted with a casing 4, consists simply of an electrode 5 carried by means whereby it can be centered in the drill hole. This centering means is constituted by a tube 6, at each end of which is a centering member 7 formed of curved springs, which press against the walls of the casing 4.

Electrode 5 is connected by an insulated conductor 8 to measuring devices at the surface of the ground. Conductor 8 serves also to suspend the assembly in the drill hole. The process, in accordance with the invention, consists in measuring or recording for each position of the electrode 5 in the drill hole, the resistance comprised between the upper extremity 9 of the insulated conductor 8, and the upper extremity 10 of the casing 4. This resistance comprises firstly:

1. The resistance of the casing 4 and the surrounding formations, this resistance being practically nil in view of the enormous sections involved.

2. The resistance $R_1$ to the passage of the current through the liquid filling the drill hole between electrode 5 and the casing 4. Since electrode 5 is centered and always retains the same position in relation to the casing whatever its position in the drill hole, this resistance depends solely on the resistivity of the liquid filling the drill hole and consequently on its temperature, as has been stated above.

3. The resistance $R_2$ of the conductor 8 passing from the surface of the ground to the electrode 5. This conductor may for instance be made of an alloy insensitive to changes of temperature, in which case the resistance of this cable will remain unchanged whatever the position occupied by electrode 5 inside the drill hole, that is to say, whatever the length of this conductor lowered in the drill hole.

In short, the resistance measured is solely the sum of the two terms: the resistance $R_1$, to the passage of the current between electrode 5 and the drill hole, and the resistance $R_2$ of conductor 8, which always remains unchanged.

The resistance $R_1$, as has been stated above, is a function solely of the temperature of the liquid filling the drill hole. One may therefore write $R_1=F(t)$, $t$ being the temperature, and the function $F(t)$ may be determined by calibration at the surface of the ground of the apparatus lowered into a tube filled with liquid of the same composition as that filling the drill hole, this calibration being effected by comparison with an ordinary thermometer for different temperatures of the liquid in which the apparatus is plunged.

Since $R_2$ can be measured also, knowing $R_1+R_2$ this quantity being measured, it is possible to determine the temperature desired.

In practice these operations are usually not indispensable, as also it is not indispensable to use a conductor 8 made of an alloy whose resistivity does not vary with the temperature. More often, as has been stated above, the only object is merely to locate the anomalies due to sudden and local variations of temperature in the liquid filling the drill hole. The resistance of conductor 8, even if it is made of an alloy which is sensitive to the influence of the temperature, will vary progressively as the conductor is moved in the drill hole. The resistance between electrode 5 and the casing, on the contrary, will vary suddenly when passing from a zone of temperature $t_1$ to a zone of temperature $t_2$ appreciably different. The total resistance $R_1+R_2$ will thus vary suddenly in passing from one zone to another, whereas it will vary progressively when moved inside a zone having no abrupt changes of temperature. It follows, therefore, that only the abrupt changes of temperature will appear on the diagram in the form of abrupt changes in the total resistance measured, the continuous variation of the average temperature of the cable producing only a regular curve in the diagram recorded.

The measurement of the resistivity between 9 and 10 at the surface of the ground may be effected in any known appropriate manner; and in particular it may be effected by means of a Wheatstone bridge, whose apices are 9 and 10 on the one hand and two other points 11 and 12 on the other hand. Between 10—11, 11—12, and 12—9, resistances are placed in a known manner, the resistance 12—9 for instance, being an adjustable resistance, whereas resistances 10—11, and 11—12 are non-adjustable resistances equal one to the other.

A source of current 13 is shunted between 9 and 11, for example, and a zero galvanometer placed on the diagonal 10—12.

For each position of electrode 5 inside the drill hole it is then sufficient to regulate the resistance 9—12 in such a way that no current passes through galvanometer G. Resistance 9—12 will then give the value of the resistance measured.

Fig. 4 shows a variation of the device illustrated in Fig. 3. The apparatus lowered inside the drill hole is the same as in the previous case, but in this case electrode 5 is connected to two insulated conductors 8', 8" passing to the surface of the ground. One of these conductors 8' terminates at one of the poles of a source of current 13, whose other pole is connected to the upper extremity 10 of the casing 4. An apparatus 15, for measuring the intensity of the current passing through the circuit thus constituted, is also placed therein.

The other conductor 8" terminating in electrode 5 is connected to one of the poles of an apparatus 14 for measuring differences of potential, the other pole thereof being also connected to the upper extremity of the casing 4. This potential-difference measuring apparatus should have a high resistance, so that the current flowing through it has a negligible value in relation to the current passing through the principal circuit.

Therefore, one can measure simultaneously firstly the intensity of the current passing through the liquid in the drill hole between electrode 5 and the casing 4, and secondly the potential difference between this electrode 5 and the casing 4. The ratio between these two values immediately gives the resistance to the passage of the current between the electrode and the casing.

Apparatuses 14 and 15 may, moreover, be combined in a known manner so as to form one apparatus, giving the ratio between the above two values; that is to say, giving directly the directly the desired resistance. The device last described has the disadvantage, in comparison with that of Fig. 3, of requiring two insulated conductors 8', 8", passing from the surface of the ground to electrode 5. On the other hand it has the advantage of eliminating the influence of the variation of the resistance of cable 8 with the temperature.

Fig. 5 shows an apparatus which can be used for making temperature measurements in either cased or uncased drill holes. That part of the apparatus which is lowered into the drill hole comprises an electrode 5, as in the former cases; but this electrode is placed inside a long insulating tube 16, whose diameter is very small in relation to its length.

The process of using this apparatus in accordance with the invention consists in measuring, for each position of the apparatus lowered into the drill hole, the resistance to the passage of a current between electrode 5 and an electrode 17 grounded at the surface. This resistance measurement may, moreover, be carried out with any suitable device, and in particular with that shown in Figs. 3 and 4.

The resistance R to be measured in this case comprises, firstly the resistance $R_a$ to the passage of the current between electrode 5 and the extremities A and A' of tube 16, and secondly the resistance $R_b$ between extremities A and A' and electrode 17. The value of this resistance $R_b$ depends on the resistivity of the liquid filling the drill hole at points A and A' and on the resistivity of the ground forming the walls of the drill hole in the neighborhood of these points (in the case of an uncased drill hole), but this value is small compared to that of $R_a$.

The resistance $R_a$, on the contrary, depends solely on the resistivity of the liquid filling the tube 16, and on the dimensions of this tube; and it is proportional to the ratio between the inner section of this tube and its length. This section and length may thus be so chosen that $R_a$ is always very large in relation to $R_b$, and that consequently the variations of $R_b$ are negligible in relation to $R_a$. The resistance measured is thus practically equal to $R_a$ and depends only on the resistivity of the liquid in which the apparatus is plunged, and consequently on the temperature of this liquid.

Fig. 6 shows a modification of the devices shown in Fig. 5. In Fig. 6 the insulating tube 16 is sheathed in a metal tube 18. This arrangement has the advantage of decreasing the value of the resistance $R_b$. This resistance is equal to the earth resistance constituted by the tube 18 and is therefore considerably less than in the former case.

Fig. 7 shows a constructional form which differs appreciably from those just described. This constructional form may be used, like those given in Figs. 5 and 6, in both cased and uncased drill holes.

In Fig. 7 the apparatus lowered into the drill hole is composed of a long insulated tube 16 having an electrode 5 in its center, and two other electrodes 19 and 20 situated on the same side in relation to electrode 5.

Electrode 5 is connected by an insulated conductor to a source of current 13, whose other pole is grounded at the surface. Furthermore, electrodes 19 and 20 are connected by two other insulated conductors 22 and 23 to a potential measuring apparatus 24.

The current sent into the ground between electrode 5 and the grounded electrode creates between electrodes 19 and 20 a potential difference which is proportional to the intensity of this current, and which depends furthermore only on the resistivity, that is to say on the temperature, of the liquid filling the tube 16. The measurement of this potential difference, combined with the measurement of the intensity of the current sent between electrode 5 and the electrode grounded at the surface, may be effected by means of a measuring device 26 for example, thus making possible and easy to measure the resistivity, and thus the temperature of the liquid filling the drill hole, at the level to which the thermometric apparatus is lowered.

In all the examples indicated above, the source of current 13 is preferably for alternating current; and the measuring apparatuses should be sensitive only to alternating current. The object of this is to eliminate the influence of the potential differences which are spontaneously produced in uncased drill holes at the level of porous beds, these potential differences being likely to vitiate the measurements.

Numerous modifications may obviously be made in the devices described above without going beyond the scope of the invention. In particular, any known electrode arrangement may be used to send an electric current into the drill hole, and to measure the effects of this electric current, so as to deduce therefrom the value of the resistivity of the liquid.

What is claimed is:

1. Process for the determination of the beds traversed by a drill hole comprising circulating in this drill hole, a liquid whose temperature is different from the natural temperature of the beds traversed by the drill hole, maintaining said circulation for a sufficient length of time to produce an appreciable change in the temperature of the more impervious of such beds and subsequently obtaining indications of the temperatures of the liquid at different depths in the drill hole.

2. Process for the determination of the beds traversed by a cased or cemented drill hole, comprising circulating therein, a liquid whose temperature is different from the natural temperature of the beds traversed by the drill hole, maintaining said circulation for a sufficient length of time to produce an appreciable change in the temperature of the more impervious of such beds and subsequently obtaining indications of the temperatures of the liquid at different depths in the drill hole.

3. Process for the determination of the correlation between beds traversed by different drill holes situated in the same zone, comprising circulating in said drill holes, a liquid whose temperature is different from the natural temperature of the beds traversed by said drill holes, maintaining said circulation for a sufficient length of time to produce an appreciable change in the temperature of the more impervious of such beds subsequently obtaining indications of the temperatures of the liquid at different depths in the different drill holes, and comparing the temperature diagrams made in said different drill holes.

4. Process for the determination of the beds traversed by a drill hole comprising circulating in this drill hole, a liquid colder than the beds traversed by the drill hole, maintaining said circulation for a sufficient length of time to produce an appreciable decrease in the temperature of the more impervious of such beds and subsequently obtaining indications of the temperatures of the liquid at different depths of the drill hole.

5. Process for the determination of the beds traversed by a drill hole comprising circulating in this drill hole, a liquid warmer than the beds traversed by the drill hole, maintaining said circulation for a sufficient length of time to produce an appreciable increase in the temperature of the more impervious of such beds and subsequently obtaining indications of the temperatures of the liquid at different depths in the drill hole.

6. Process for the determination of the beds traversed by a drill hole comprising circulating in this drill hole, a liquid whose temperature is different from the natural temperature of the beds traversed by the drill hole, maintaining said circulation for a sufficient length of time to produce an appreciable change in the temperature of the more impervious of such beds and obtaining different indications of temperature at successive intervals after having stopped the circulation of the liquid in the drill hole.

7. Process for obtaining indications of the temperatures of a liquid filling a drill hole at different levels therein, when said liquid is of homogeneous composition, comprising obtaining indications of a parameter depending on the electrical resistivity of this liquid at different levels inside said drill hole.

8. Process for obtaining indications of the temperatures of a liquid filling a drill hole at different levels therein, when said liquid is at rest after having circulated for a certain length of time, comprising obtaining indications of a parameter depending on the electrical resistivity of this liquid at different levels inside the drill hole.

9. Process for obtaining indications of the temperatures of a liquid filling a drill hole at different levels therein, when said liquid is of homogeneous composition, comprising sending an electric current into the liquid filling the drill hole at different levels therein, and obtaining indications of the effects of the passage of this current in the liquid.

10. Process for the determination of the beds traversed by a drill hole comprising the steps of modifying the heat content of the beds surrounding the drill hole to change the temperatures of the more impervious of such beds to values appreciably different from their natural temperatures and subsequently obtaining indications of temperature at different depths in the drill hole.

11. A process for the determination of the beds traversed by a drill hole comprising the steps of supplying heat to the beds surrounding the drill hole to raise the temperatures of the more impervious of such beds appreciably above their natural temperatures, and subsequently obtaining indications of temperature at different depths in the drill hole.

12. A process for the determination of the beds traversed by a drill hole comprising the steps of removing heat from the beds surrounding the drill hole to lower the temperatures of the more impervious of such beds appreciably below their natural temperatures, and subsequently obtaining indications of temperature at different depths in the drill hole.

13. A process for investigating earth formations traversed by a bore hole comprising circulating through the bore hole a liquid the temperature of which is different from the natural temperature of the formations traversed by the bore hole, maintaining said circulation for a sufficient length of time to produce an appreciable change in the temperature of the more impervious of such beds, discontinuing the circulation to permit said liquid to become stratified into zones of different temperature adjacent formations of different thermal properties, and obtaining indications of the temperature of the liquid at different depths in the bore hole.

14. A process for investigating earth formations traversed by a bore hole comprising circulating through the bore hole a liquid the temperature of which is colder than the natural temperature of the formations traversed by the bore hole, maintaining said circulation for a sufficient length of time to produce an appreciable decrease in the temperature of the more impervious of such beds, discontinuing the circulation to permit said liquid to become stratified into relatively warm zones adjacent relatively porous formations and into relatively colder zones in the vicinity of relatively non-porous formations, and obtaining indications of the temperature of the liquid at different depths in the bore hole.

15. A process for investigating earth formations traversed by a bore hole comprising circulating through the bore hole a liquid the temperature of which is warmer than the natural temperature of the formations traversed by the bore hole, maintaining said circulation for a sufficient length of time to produce an appreciable increase in the temperature of the more impervious of such beds, discontinuing the circulation to permit said liquid to become stratified into relatively cold zones adjacent relatively porous formations and into relatively warmer zones in the vicinity of relatively non-porous formations, and obtaining indications of the temperature of the liquid at different depths in the bore hole.

EUGENE G. LEONARDON.